US006947233B2

(12) United States Patent
Toda

(10) Patent No.: US 6,947,233 B2
(45) Date of Patent: Sep. 20, 2005

(54) DISK DRIVE APPARATUS AND METHOD FOR COMPENSATING FOR ERROR IN SERVO-INFORMATION-RECORDED POSITION BETWEEN HEADS

(75) Inventor: Akio Toda, Kitatsuru-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 469 days.

(21) Appl. No.: 10/095,575

(22) Filed: Mar. 13, 2002

(65) Prior Publication Data

US 2003/0026023 A1 Feb. 6, 2003

(30) Foreign Application Priority Data

Aug. 2, 2001 (JP) ....................................... 2001-235107

(51) Int. Cl.[7] ............................ G11B 5/09; G11B 5/596

(52) U.S. Cl. ................... 360/51; 360/78.14; 360/77.08; 360/49; 360/48; 360/98.01; 360/78.09; 369/43; 369/44.25; 369/44.26; 369/44.31; 369/44.34

(58) Field of Search ......................... 360/51, 53, 78.14, 360/48–49, 61–62, 68, 78.05, 98.01, 78.09, 77.02–77.03, 77.05–77.08, 77.11, 55, 78.04, 78.07; 369/43, 44.25, 44.26, 47–49, 44.31, 44.34, 47.21; 324/210, 207.21; 318/560, 561, 569, 636, 600

(56) References Cited

U.S. PATENT DOCUMENTS

| | | | | |
|---|---|---|---|---|
| 5,140,571 A | | 8/1992 | Nishida et al. | |
| 5,828,513 A | | 10/1998 | Greenberg | |
| 5,926,333 A | * | 7/1999 | Bang | 360/51 |
| 6,021,012 A | * | 2/2000 | Bang | 360/51 |
| 6,091,567 A | | 7/2000 | Cooper et al. | |
| 6,115,199 A | * | 9/2000 | Bang | 360/51 |
| 6,122,121 A | * | 9/2000 | Keeler et al. | 360/51 |

FOREIGN PATENT DOCUMENTS

| | | | |
|---|---|---|---|
| JP | 7-37326 | | 2/1995 |
| JP | 07-037326 | * | 2/1995 |
| JP | 2000-100095 | * | 4/2000 |
| JP | 2000-222841 | | 8/2000 |
| WO | WO 93/06595 | | 4/1993 |

OTHER PUBLICATIONS

"Disk File With Arm Mounted Electronics", Jan. 1980, IBM Technical Disclosure Bulletin, vol. No. 22, Issue No. 8B, pp. 3803–3806.*

* cited by examiner

*Primary Examiner*—David Hudspeth
*Assistant Examiner*—Natalia Figueroa
(74) *Attorney, Agent, or Firm*—Pillsbury Winthrop Shaw Pittman, LLP

(57) ABSTRACT

In a first mode, an R/W channel starts to monitor read information to thereby detect a servo mark contained in servo information, each time a servo controller generates a servo gate pulse. Upon detecting the servo mark, the R/W channel detects, from the read information, position information contained in the servo information and following the servo mark, at a timing determined by the detection timing of the servo mark. When the first mode has been switched to a second mode, the R/W channel detects the servo mark and position information using the synchronous method.

11 Claims, 10 Drawing Sheets

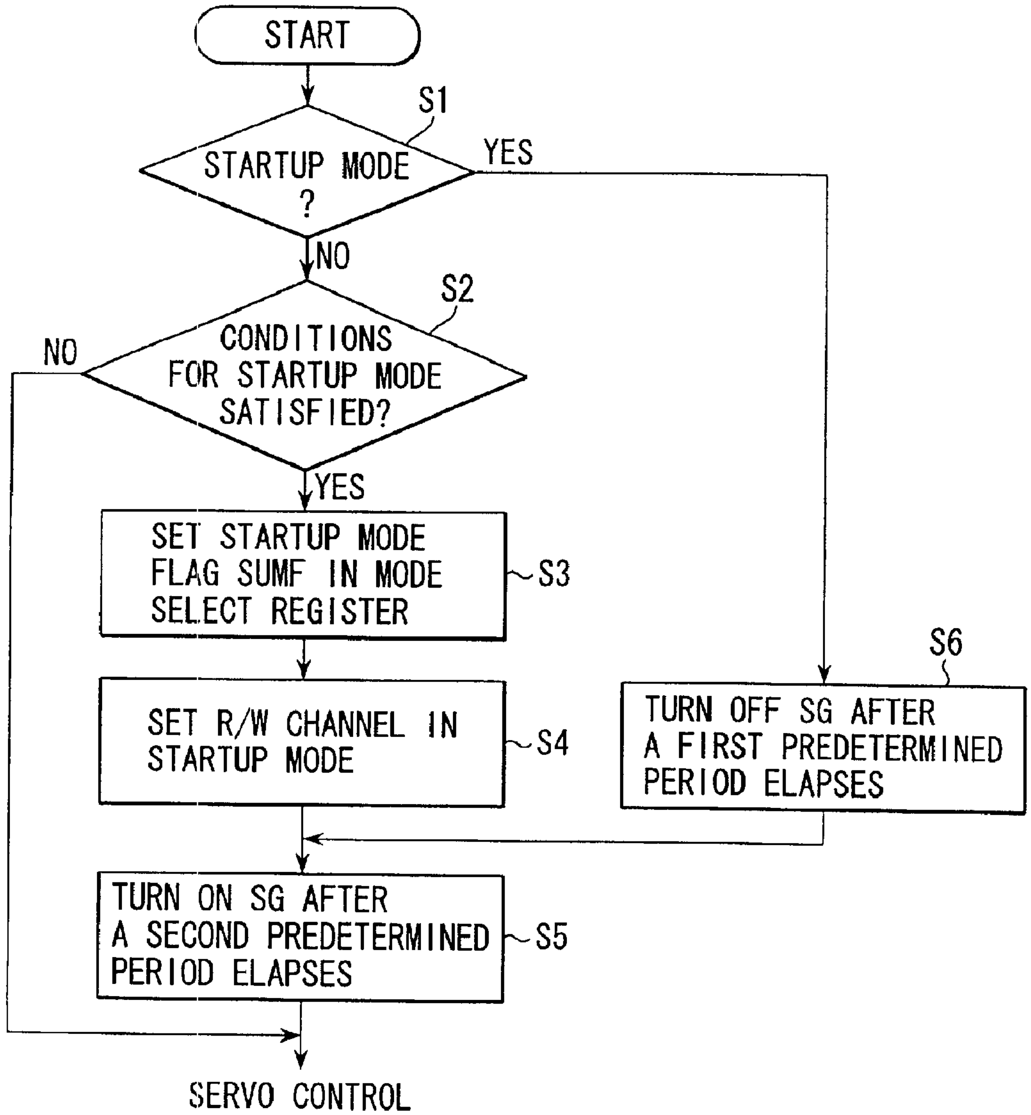
F I G. 6

DISK DRIVE APPARATUS AND METHOD FOR COMPENSATING FOR ERROR IN SERVO-INFORMATION-RECORDED POSITION BETWEEN HEADS

CROSS-REFERENCE TO RELATED APPLICATIONS

This application is based upon and claims the benefit of priority from the prior Japanese Patent Application No. 2001-235107, filed Aug. 2, 2001, the entire contents of which are incorporated herein by reference.

BACKGROUND OF THE INVENTION

1. Field of the Invention

The present invention relates to a disk drive apparatus equipped with a plurality of disks on which servo information is prerecorded, and more particularly to a disk drive apparatus and method suitable for compensating for non-continuity of servo information that occurs, for example, when one head is selected.

2. Description of the Related Art

A hard disk drive is known as a disk drive using disks as storage mediums. In a hard disk, in general, a head is moved to a target track by seek control and positioned in a target area on the target track, on the basis of servo information prerecorded on each disk.

In the prior art, servo information is written to each disk in the following procedure, after heads and disks are assembled into a head/disk assembly (hereinafter referred to as an "HDA"). First, the HDA is set in a servo track writer (STW). Subsequently, under the control of the servo track writer, the heads in the HDA write servo information to the respective disks therein. This servo information writing method is, however, inefficient.

Recent servo track writers are configured to simultaneously write servo information to the disks of a plurality of drives. To enable this writing, a plurality of disks are stacked in a servo track writer of this type. Further, heads dedicated to the writing of servo information are provided at the respective positions of the disks stacked in the servo track writer. These heads simultaneously write servo information to the respective disks. This servo information writing method (hereinafter referred to as a "pre-servo method") enhances the efficiency of writing servo information to the disks.

The hard disk drives include an IC (Integrated Circuit), called a read/write (R/W) channel, i.e. a read/write IC. The read/write IC executes various types of signal processing, such as an A/D (Analog/Digital) conversion process on a read signal read from a disk, an encoding process on write data, and a decoding process on read data, etc. The read/write IC also executes a servo information detection (reading) process. In general, the servo information contains various types of data, such as a servo mark, a servo sector address, a cylinder address (cylinder code) and burst data, etc. Accordingly, in the prior art, it is necessary to supply various timing signals to the read/write IC for servo information detection (reading).

On the other hand, a recent read/write IC, which is multifunctional owing to the developed IC techniques, can generate all timing signals necessary for the detection of servo information. This read/write IC can generate the timing signals in synchronism with a servo gate (a servo gate signal).

The method of enabling the detection of the servo information only utilizing a servo gate is called a synchronous servo method. In a hard disk drive that uses the synchronous servo method, a servo gate is generated by a servo controller. The servo controller is generally formed of an ASIC (Application Specific Integrated Circuit).

As described above, in the pre-servo method, in which the disks of a plurality of drives are stacked in the servo track writer, thereby simultaneously writing servo information to the disks, the efficiency of writing servo information to each disk is enhanced. However, where a number of required disks with servo information are assembled into an HDA, and this HDA is mounted in a hard disk drive, it is possible that servo-information-recorded positions (hereinafter referred to as "servo positions") on one disk may be physically displaced, circumferentially or radially, from those on another disk.

On the other hand, in a hard disk drive that uses the synchronous servo method, it is necessary to synchronize the leading edge of each pulse of a servo gate with each servo position. However, where the servo positions on one disk are physically displaced from those on another disk as a result of the use of the pre-servo method, the timing of a servo gate differs from an actual servo position upon, for example, head selection.

Thus, where the timing of a servo gate differs from an actual servo position, the seek time required to move the head to a target track on the basis of servo information is increased. Furthermore, a servo mark, as servo identification information contained in the servo information, may not be detected (servo mark absence), or the servo information may be detected at an erroneous timing (erroneous servo detection), which causes an erroneous output timing of a servo gate and hence a reduction of the seek performance.

BRIEF SUMMARY OF THE INVENTION

The present invention has been developed in light of the above, and aims to compensate for a displacement of a servo position if it occurs upon, for example, head selection in a disk drive, thereby minimizing degradation of the performance of the disk drive upon, for example, head selection.

According to an aspect of the invention, there is provided a disk drive apparatus comprising: a plurality of disks each including at least one recording surface on which servo information items each containing position information are recorded, each servo information item containing a servo mark used to identify the servo information item, the servo information items being recorded at regular intervals on a single circumferential portion of each recording surface of the disks; and a head provided for each recording surface of the disks and used at least to read information from a corresponding disk. The disk drive apparatus also comprises means for selecting one of the heads, a servo gate generator, detection means and controlling means. The servo gate generator generates a series of servo gate pulses indicative of timings at which the servo information items are read by a head, selected by the select means, from the corresponding disk. The detection means starts, in a first mode each time the servo gate generator generates a servo gate pulse, detection of the servo mark, contained in the each servo information item, from information read by the selected head from the corresponding disk, thereby detecting, from the read information, the position information contained in the each servo information item, at a timing determined by a timing at which the servo mark has been detected. In a second mode, the detection means detects the servo mark and the position information, contained in the each servo information item, from the information read by the selected head from the corresponding disk, at respective timings determined by timings at which the servo gate generator generates respective servo gate pulses. The controlling means controls, in the first mode, the generation of the servo gate pulses by the servo gate generator, using a program.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a flowchart useful in explaining a servo interruption process executed by a CPU 24 in the embodiment;

DETAILED DESCRIPTION OF THE INVENTION

Figure 1:
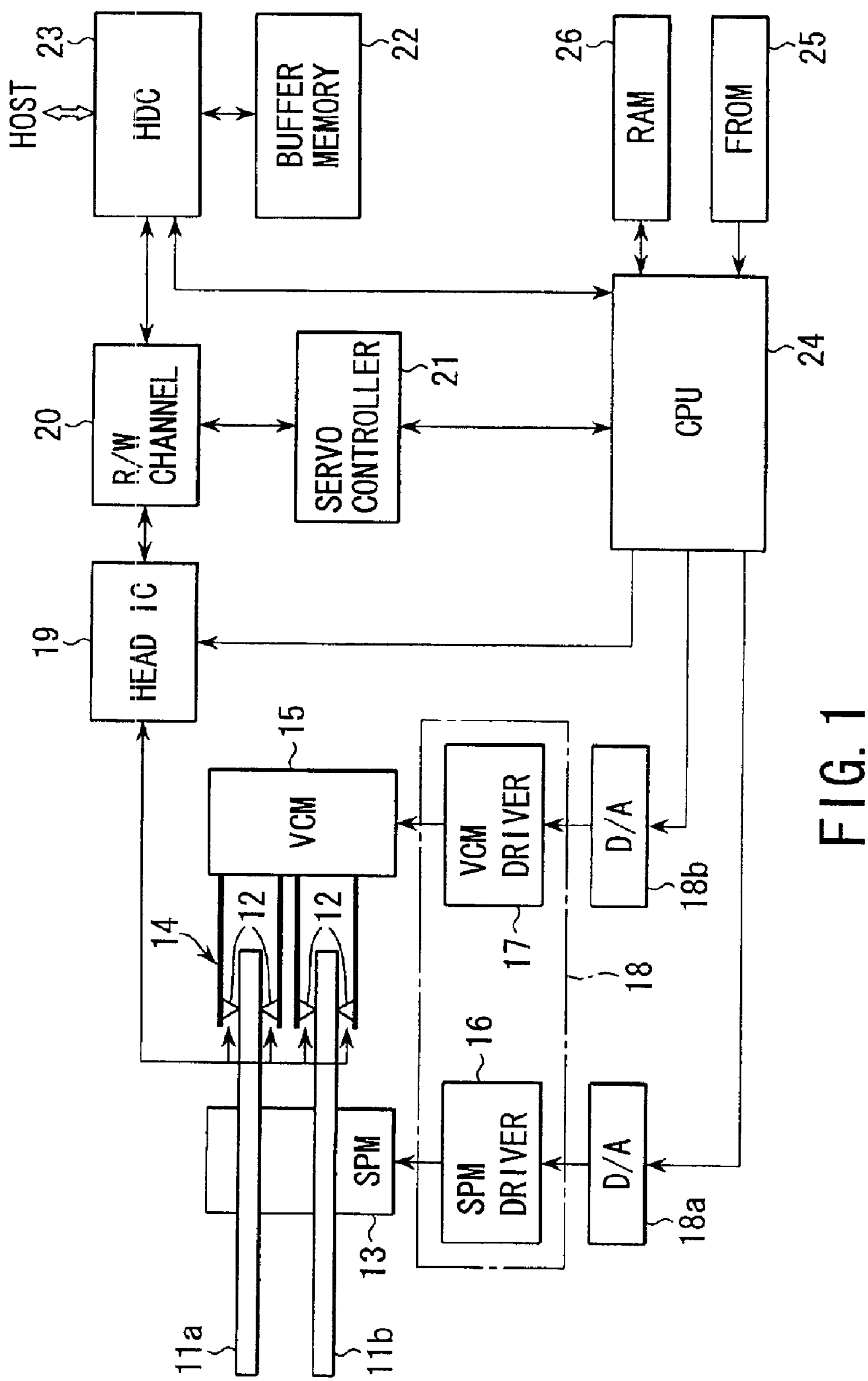
FIG. 1 is a block diagram illustrating the configuration of a hard disk drive according to an embodiment of the invention.

An embodiment in which the invention is applied to a hard disk drive will be described with reference to the accompanying drawings. FIG. 1 is a block diagram illustrating the configuration of the hard disk drive according to the embodiment of the invention. In the hard disk drive (HDD) shown in FIG. 1, a number (e.g. two) of disks (magnetic disk mediums) 11*a* and 11*b*, on which data is magnetically recorded, are stacked. Each disk 11*i* (i=a, b) has two (upper and lower) disk surfaces. At least one (e.g. both) of the two surfaces of each disk 11*i* serves as a recording surface for recording data. Heads (magnetic heads) 12, which are used to read/write data from/to each disk 11*i* (data reproduction/recording), are provided for the respective recording surfaces of each disk 11*i*. Suppose here that servo information is prerecorded by the pre-servo method on the disks 11*a* and 11*b*. The number of disks is not limited to two. It is sufficient if the HDD includes a plurality of stacked disks.

Figures 2A, 2B, 2C, 2D:
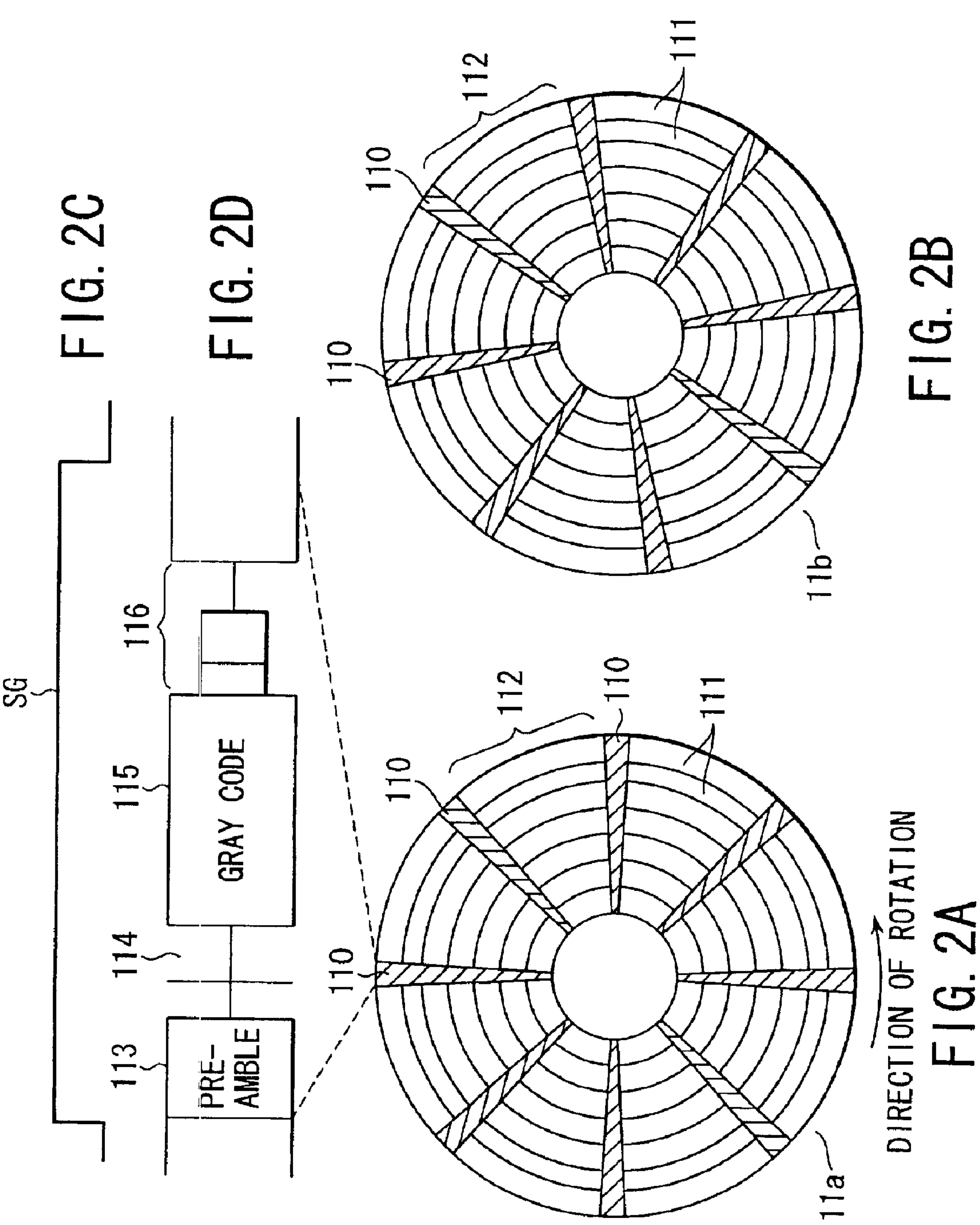
FIG. 2A is a view illustrating the concept of a format used in a disk 11*a* appearing in FIG. 1.
FIG. 2B is a view illustrating the concept of a format used in a disk 11*b* appearing in FIG. 1, and also illustrating a state in which servo areas 110 recorded on the disk 11*a* shown in FIG. 2A are displaced from those recorded on the disk 11*b;*
FIG. 2C is a view showing a servo gate.
FIG. 2D is a view illustrating the concept of a data format used in each servo area 110, as compared to the servo gate shown in FIG. 2C.

As shown in FIGS. 2A and 2B, a plurality of servo areas 110 are arranged on each recording surface of the disks 11*a* and 11*b* at radially and circumferentially regular intervals. Servo information containing position information is recorded on each servo area 110. A number of concentric tracks 111 are formed on each recording surface of the disks 11*a* and 11*b*. A user data area 112 is provided between each pair of adjacent servo areas 110. A plurality of data sectors are provided in each data area 112.

As described above, the servo information is recorded on the disks 11*a* and 11*b* by the pre-servo method. Suppose here that the positions of the servo areas 110, i.e., servo positions, of the disk 11*a* are physically displaced from those of the disk 11*b* in the circumferential direction of the disks, as is shown in FIGS. 2A and 2B. Further, it is possible that the radial position of a head 12 on the disk 11*a* may be displaced from that of another head 12 on the disk 11*b*. In other words, the cylinder position of the head on the disk 11*a* and a position error of the head at the cylinder position on the disk 11*a* may differ from those on the other disk 11*b*.

As shown in FIG. 2D, each servo area 110 comprises a preamble area 113, a servo mark area 114, a gray code area 115 and a burst area 116. The preamble area 113 includes an AGC (Automatic Gain Control) area in which a signal of a predetermined frequency, used to stabilize the amplitude of a read signal, is recorded, and also includes an erase section. In the servo mark area 114, a special mark (servo mark) for identifying (servo information recorded in) each servo area is recorded. In this case, the servo mark is "14h" (h indicates that this value is expressed in the hexadecimal number system). In the gray code area 115, an address (servo sector address) assigned to each servo area and a cylinder address (cylinder code) assigned to a corresponding track are recorded in a gray code. In the burst area 116, burst data (PES information) is recorded. The burst data is a position error signal used to indicate, in a waveform amplitude, a position error in a cylinder denoted by the cylinder address in the gray code area 115. Thus, the servo information recorded in each servo area 110 contains the servo mark, servo sector address, cylinder address and burst data (the cylinder address and burst data serve as position information).

Referring again to FIG. 1, each disk 11*i* (i=a, b) is rotated at a high speed by a spindle motor (hereinafter referred to as an "SPM") 13. Each head 12 is attached to a corresponding actuator (head actuator) 14, and can radially move on a corresponding disk 11*i* in accordance with the rotation of the actuator 14. As a result, each head 12 is moved to a target track by seek control and positioned in a target area on the target track. The actuator 14 includes a voice coil motor (hereinafter referred to as a "VCM") 15 as its driving source, and is driven by the VCM 15. A ramp mechanism (not shown) is provided outside the outer peripheries of the disks 11*a* and 11*b*. The ramp mechanism includes parking areas for retracting thereon the respective heads 12 provided for the respective recording surfaces of the disks 11*a* and 11*b*, when the HDD is shifted to its idle state.

The SPM 13 is powered by a driving current (SPM current) supplied from an SPM driver 16. The VCM 15 is powered by a driving current (VCM current) supplied from a VCM driver 17. In this embodiment, the SPM driver 16 and VCM driver 17 are included in a driver IC 18 integrated in one chip. A CPU 24 determines values (control variables) used to determine respective driving currents supplied from the SPM driver 16 to the SPM 13 and from the VCM driver 17 to the VCM 15. One of the control variables is supplied to the SPM driver 16 via a D/A (Digital/Analog) converter (D/A) 18*a*, and the other to the VCM driver 17 via a D/A converter 18*b*.

Each head 12 is connected to a head IC 19. The head IC 19 is mounted on a flexible printed circuit board (FPC) (not shown). The head IC 19 includes a read amplifier and a write amplifier. The read amplifier amplifies a read signal read by a head 12 that is selected by the CPU 24. The write amplifier converts write data into a write current. The head IC 19 is connected to a read/write IC (hereinafter referred to as a "R/W channel") 20.

The R/W channel 20 executes various signal processes. These signal processes include an A/D (Analog/Digital) conversion process executed on a read signal, an encoding process on write data, and a decoding process on read data. The R/W channel 20 operates in an operation mode (servo gate control mode) set by the CPU 24. There are two operation modes—a start-up mode (initial mode) and a normal mode (normal servo gate control mode). The start-up mode is used in a case where the servo-information-position intervals (hereinafter referred to as "servo intervals") of a disk are displaced from those of another disk. The normal mode is used in a case where there are no displacements in servo intervals between disks. The R/W channel 20 has a function for generating, in the normal mode, internal timing signals in synchronism with the leading edge of each pulse of a servo gate (a servo gate signal) SG output from a servo controller 21. The R/W channel 20 has another function for detecting data included in the servo information, i.e., a servo mark, a gray code and burst data, in accordance with the internal timing signals. The R/W channel 20 also has a function for starting, in the start-up mode, the operation of searching the servo information to thereby detect the servo mark, in synchronism with the leading edge of each pulse of a servo gate SG; and a function for detecting the gray code and burst data following the servo mark, at a time point that is determined, on the basis of the detection time point of the servo mark, when the servo mark has been detected.

Moreover, the R/W channel 20 a function for determining the data quality of the detected servo mark on the basis of the level of the detected servo mark. The data quality of the servo mark is based on, for example, whether the detected servo mark can be completely or substantially recognized as a servo mark. In synchronism with the detection of the servo mark, the R/W channel 20 has yet another function for supplying, by serial transfer, the servo controller 21 with servo mark quality information indicative of the determined quality, and also supplies, by serial transfer, the servo controller 21 with the gray code and burst data (burst data obtained after A/D conversion) detected after the servo mark. The servo mark quality information is formed of 4 bits, the leading bit being "1". The leading bit "1" is an instruction to start the transfer of the servo information from the R/W channel 20 to the servo controller 21. The servo information to be transferred at this time is the gray code and burst data that follow the servo mark.

The servo controller 21 has a function for determining the start of transfer of the servo information from the leading bit "1" of the servo mark quality information transferred from the R/W channel 20, thereby decoding the 4-bit quality information, which begins from the leading bit "1". The servo controller 21 has another function for outputting a start bit SB indicative of the reference position of each servo area, if the decoding result of the quality information indicates that the R/W channel 20 has correctly detected the servo mark ("14h"). The servo controller 21 has yet another function for generating a servo gate SG on the basis of the result of a time measurement started in synchronism with the start bit SB. The servo controller 21 also has a function for decoding the gray code, transferred from the R/W channel 20, into an servo sector address and a cylinder address, and a function for storing the servo sector address, cylinder address and burst data in a servo register (SV register) 221 described later.

Figure 3:
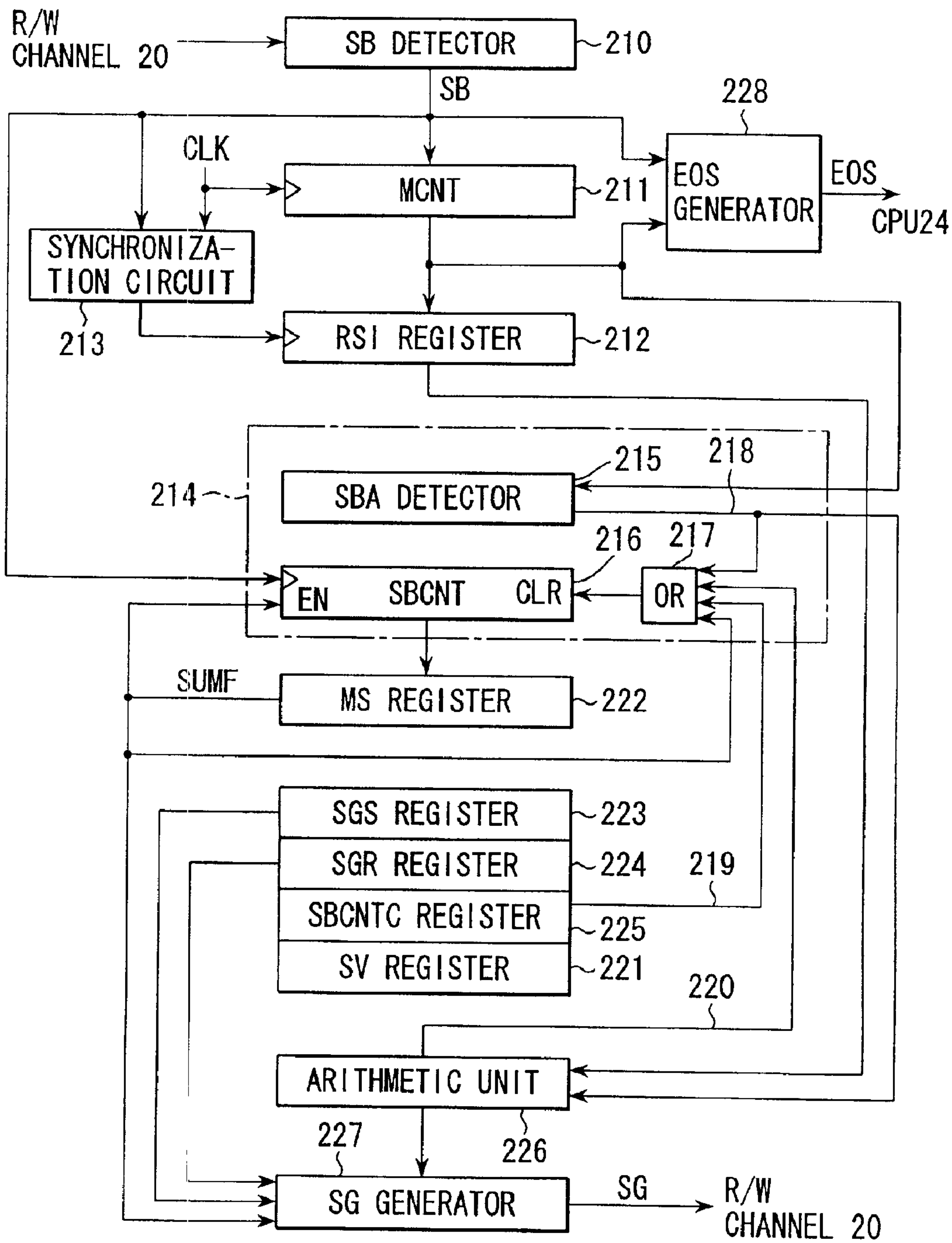
FIG. 3 is a block diagram illustrating the configuration of a servo controller 21 appearing in FIG. 1.
Figures 4A, 4B, 4C, 4D, 4E, 4F, 4G:
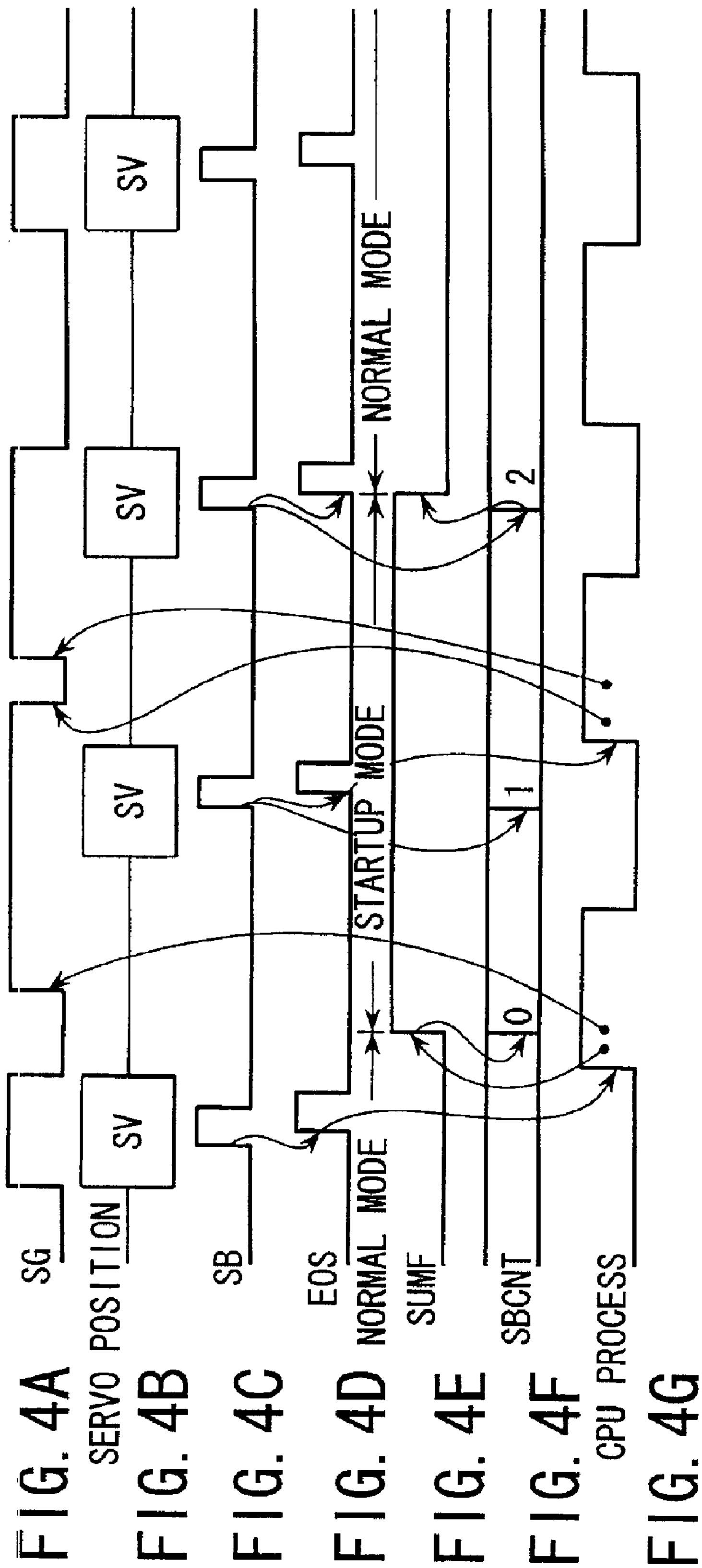
FIGS. 4A to 4G are timing charts useful in explaining servo gate control executed in the embodiment.
Figures 5A, 5B, 5C, 5D, 5E, 5F, 5G:
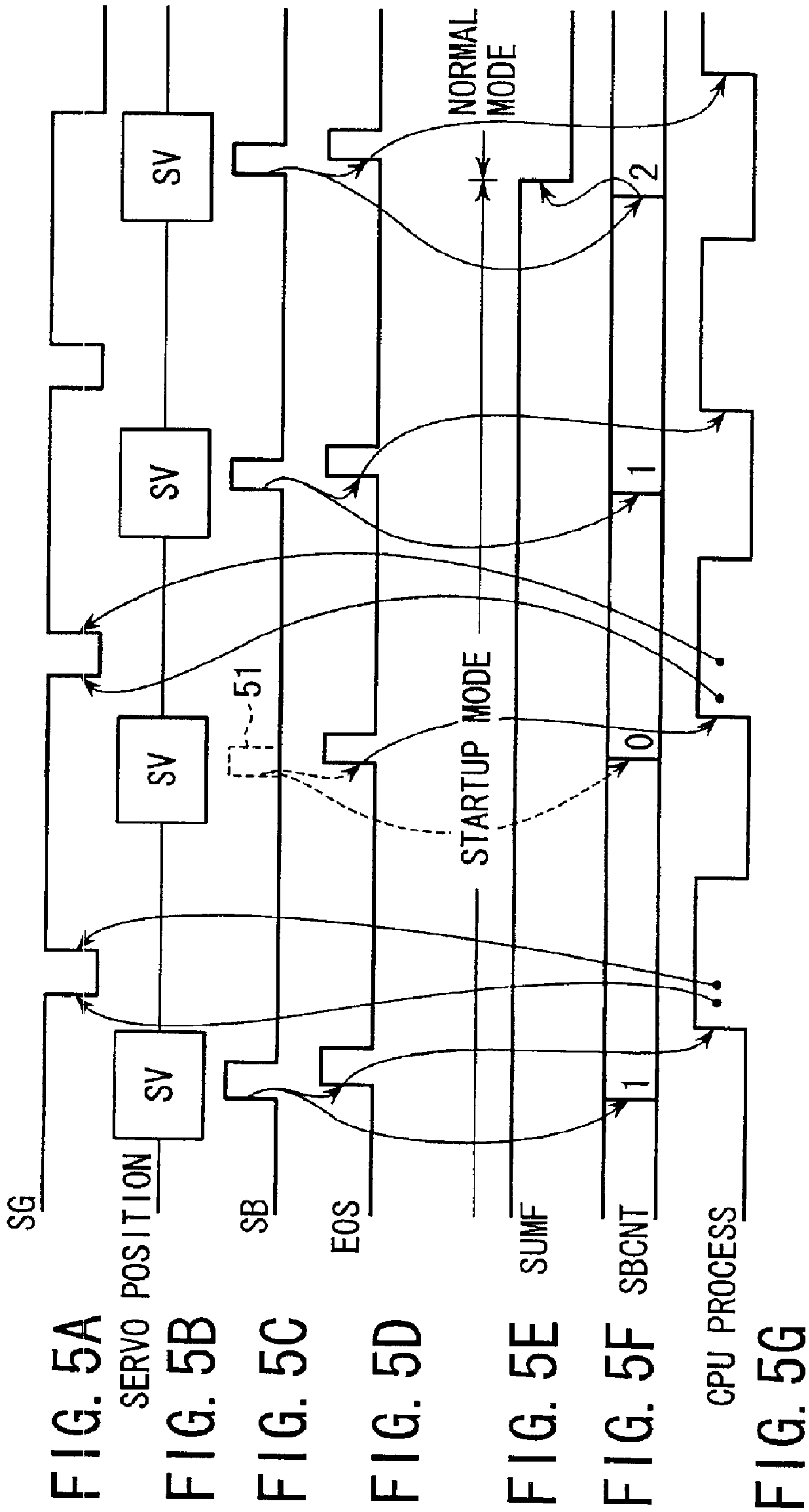
FIGS. 5A to 5G are timing charts useful in explaining servo gate control executed in the embodiment when start bit missing has occurred.

FIG. 3 is a block diagram showing the servo controller 21. The servo controller 21 is formed of an ASIC (Application Specific Integrated Circuit) such as a gate array. The servo controller 21 includes a start-bit detector (hereinafter referred to as an "SB detector") 210. The SB detector 210 detects, by decoding servo mark quality information transferred from the R/W channel 20, that the R/W channel 20 has correctly detected a servo mark ("14h") contained in servo information. If the SB detector 210 detects that the servo mark has been correctly detected, it outputs a start bit SB. Hereinafter, the expression "a start bit SB has been detected" may be used to indicate the fact that a servo mark ("14h") has been correctly detected.

The servo controller 21 also includes a main counter (hereinafter referred to as an "MCNT") 211, a real-servo-interval register (hereinafter referred to as an "RSI register") 212 and a synchronization circuit 213. The MCNT 211 measures a servo interval on the basis of a start bit SB in synchronism with a clock CLK. The RSI register 212 is used to hold the servo interval (real servo interval) measured by the MCNT 211. The synchronization circuit 213 generates a timing signal for holding the real servo interval in the RSI register 212, on the basis of the start bit SB and clock CLK.

The servo controller 21 further includes a start-bit-continuity detector (hereinafter referred to as an SBC detector) 214 for detecting that a plurality (e.g. two) of start bits SB have been continuously detected. The SBC detector 214 includes a start-bit-absence detector (hereinafter referred to an "SBA detector") 215, a start-bit counter (hereinafter referred to an "SBCNT") 216, and an OR gate (OR) 217. The SBA detector 215 detects the absence of a start bit SB from the count value of the MCNT 211. The SBCNT 216 counts the number of occasions on which start bits SB are continuously detected in the startup mode. The OR gate 217 outputs a signal for clearing the SBCNT 216. The OR gate 217 inputs signals 218–220 and a signal indicative of the state of a startup mode flag SUMF. The signal 218 indicates that the SBM detector 215 has detected the absence of a start bit SB. The signal 219 indicates that the CPU 24 has instructed the SBCNT 216 to clear its count value. The signal 220 indicates that the timing of a servo gate calculated by an arithmetic unit 226, described later, is abnormal.

The servo controller 21 further includes a servo register (hereinafter referred to as an "SV register") 221, a mode select register (hereinafter referred to an "MS register") 222, a servo-gate-set register (hereinafter referred to an "SGS register") 223, a servo-gate-reset register (hereinafter referred to an "SGR register") 224 and a start-bit-counter-clear register (hereinafter referred to an "SBCNTC register") 225. The SV register 221 is used to hold a servo sector address, a cylinder address and burst data. The MS register 222 is used to set a flag (startup mode flag) SUMF for switching modes related to servo gate control executed by the servo controller 21. The modes switched by the flag SUMF are the aforementioned startup mode (initial mode) and a normal mode. The SGS register 223 is used to forcibly turn on a servo gate SG when the CPU 24 has accessed the register 223. The SGR register 224 is used to forcibly turn off a servo gate SG when the CPU 24 has accessed the register 224. The SBCNTC register 225 is used to forcibly clear the SBCNT 216 when the CPU 24 has accessed the register 225.

The servo controller 21 also includes the arithmetic unit 226, a servo gate generator (hereinafter referred to as an "SG generator") 227 and an interrupt generator (hereinafter referred to as an "EOS generator") 228. The arithmetic unit 226 calculates, on the basis of the value of the RSI register 212, a correction value necessary to correct the timing of a servo gate to that reflecting a change in servo interval. The SG generator 227 generates a servo gate SG to be supplied to the R/W channel 20. In this embodiment, the SG generator 227 generates a servo gate SG on the basis of the arithmetic result of the arithmetic unit 226 in the normal mode, and generates it in response to an instruction from the CPU 24 in the startup mode. Accordingly, the SG generator 227 is configured such that, in the startup mode, a servo gate SG is not turned on or off by the value of the MCNT 211. The EOS generator 228 generates an interrupt signal EOS (servo interrupt signal) to the CPU 24 in synchronism with a servo gate SG. The EOS generator 228 generates a servo interrupt signal EOS in response to a start bit SB. The EOS generator 228 also generates a servo interrupt signal EOS depending upon the value of the MCNT 211. The EOS generator 228 may be modified such that it generates a servo interrupt signal EOS only in response to a start bit SB.

Referring again to FIG. 1, the buffer memory 22 is used to temporarily store data (write data) transferred from a host (a host system using the HDD) and to be written to each disk 11*i* (i=a, b), and also to temporarily store data (read data) read from each disk 11*i* and to be transferred to the host. The buffer memory 22 is, for example, a RAM (Random Access Memory) as a rewritable memory. A disk controller (hereinafter referred to as an "HDC") 23 is used to receive a command (a write command, a read command, etc.) transferred from the host, and has an interface control function for controlling data transfer between the host and the HDC 23. The HDC 23 also has a disk control function for controlling data transfer between each disk 11*i* and the HDC 23 via the R/W channel 20 and the head IC 19, and a buffer control function for controlling the buffer memory 22.

The CPU 24 controls the entire HDD in accordance with a control program stored in, for example, an FROM (Flash Read Only Memory) 25 as a rewritable nonvolatile memory. In the description below, this control program will be referred to as "FW" (Firmware). The control executed by the CPU 24 includes read/write control executed, using the HDC 23, in response to a read/write command from the host, seek control for moving each head 12 to a target track, and positioning control for positioning each head 12 in a target area on the target track, etc. For the seek control and positioning control, the CPU 24 acquires a cylinder address and burst data from the SV register of the servo controller 21. The FROM 25 prestores, as well as the FW, parameter values, described later, necessary to determine whether or not an estimated head position should be used upon head selection. The CPU 24 is connected to a RAM 26 which provides, for example, a work area for the CPU 24. Instead of this configuration, the CPU 24 can be configured to contain the FROM 25 and RAM 26.

The operation of the HDD shown in FIG. 1 will now be described. First, an outline of the servo gate control will be described. In this embodiment, servo information is recorded by the pre-servo method on the two disks 11*a* and 11*b* installed in the HDD of FIG. 1. Accordingly, as shown in FIGS. 2A and 2B, it is possible that the physical position of each servo area 110, i.e. a physical servo position, in the disk 11*a* may be displaced from that of a corresponding servo area 110 in the disk 11*b*. In this case, it is possible that the servo gate timing of the disk 11*a* may be asynchronous with that of the disk 11*b*. In light of this, in the embodiment, servo gate control is executed, on the assumption that the servo positions on the disk 11*a* may be displaced from those on the disk 11*b*, in order to correct the displacements. The servo controller 21 basically executes this control.

To determine the timing of a servo gate (a servo gate signal) SG, it is necessary to detect the interval between two continuous physical servo positions, i.e. a servo interval. To this end, the servo controller 21 detects two continuous servo marks to obtain the initial servo interval, whereby the HDD can be shifted from the startup mode to the normal mode. In the normal mode, the SG generator 227 of the servo controller 21 automatically generates a servo gate SG in accordance with the servo interval measured by the servo controller 21.

If the conditions necessary to switch the normal mode to the startup mode are satisfied, the servo controller 21 switches the mode of the HDD to the startup mode as a result of a process (an FW process) executed by the CPU 24 in accordance with the FW stored in the FROM 25. The conditions for the switchover to the startup mode are satisfied in a case where the timing of a servo gate is absent, i.e. where the servo gate timing of one disk differs from that of the other disk. More specifically, the conditions are satisfied upon the first seek control for moving each head 12 from the ramp mechanism to a corresponding disk 11*i*, upon head selection, in particular, upon head selection to switch a head of one disk to a head of the other disk, or where servo-mark detection errors have continuously occurred, etc. In the startup mode, the SG generator 227 of the servo controller 21 generates a servo gate SG at the timing determined by the CPU 24.

A detailed description will now be given of the servo gate control executed in the HDD of FIG. 1, referring to the timing charts of FIGS. 4A to 4G and 5A to 5G and the flowchart of FIG. 6.

In the normal mode, the R/W channel 20 generates internal timing signals in synchronism with the leading edge of each pulse of a servo gate SG that is automatically generated by the SG generator 227 of the servo controller 21. In synchronism with the internal timing signals, the R/W channel 20 detects each data item contained in the servo information, i.e. a servo mark, a gray code and burst data, from read data read by a selected head 12 and amplified by the head IC 19. Thus, in the normal mode, the R/W channel 20 detects each data item in the servo information, using the synchronous servo method.

On the other hand, in the startup mode (initial mode), the R/W channel 20 starts a search operation, described below, at a time point at which each pulse of a servo gate SG generated by the SG generator 227 at the timing determined by the CPU 24 rises. In other words, the R/W channel 20 monitors the read data read by the selected head 12 and amplified by the head IC 19, thereby starting a search operation for detecting a servo mark from the read data. If the R/W channel 20 has detected a servo mark within a predetermined period of time, it detects, at the timing determined by the timing of the servo mark detection, a gray code and burst data which follow the servo mark.

The R/W channel 20 determines the data quality of the detected servo mark in accordance with the detection level. After that, the R/W channel 20 supplies, to the servo controller 21 by serial transfer, 4-bit servo-mark-quality information indicative of the determined quality. The leading bit (first bit) of the 4-bit servo-mark-quality information is "1" and indicates a start bit SB. The second bit of the servo-mark-quality information indicates, if it is "1", that a servo mark has been detected, and indicates, if it is "0", that no servo mark has been detected. The third bit of the servo-mark-quality information indicates the quality of the detected servo mark. Specifically, if the third bit is "0", the servo mark is of a high quality (e.g. it contains a 1-bit error or no error), while if it is "1", the servo mark is of a low quality (e.g. it contains a 2-bit or more error). Since the fourth bit of the servo-mark-quality information is irrelevant to the present invention, no description is given thereof. Further, when the R/W channel 20 has detected the gray code and burst data following the servo mark, it supplies the detected data to the servo controller 21 by serial transfer. The burst data is, however, transferred after it is subjected to A/D conversion.

The SB detector 210 of the servo controller 21 decodes 4-bit servo-mark-quality information that begins from logic "1" and is contained in the data supplied, by serial transfer, from the R/W channel 20. If the decoded quality information is of a predetermined 4-bit value, e.g. "1101", the SB detector 210 determines that the quality information indicates a high quality, and that the R/W channel 20 has correctly detected the servo mark. Each time the SB detector 210 detects that the servo-mark-quality information is "1101", it outputs a start bit SB. This configuration may be modified such that the SB detector 210 outputs a start bit SB if the quality information is "110x" or "11xx" (x is "0" or "1").

The MCNT 211 of the servo controller 21 executes a counting operation in synchronism with the internal clock CLK. The MCNT 211 stops the counting operation upon receiving a start bit SB from the SB detector 210. At this time, the count value of the MCNT 211 is latched by the RSI register 212 at the timing generated by the synchronigation circuit 213. More specifically, the count value is latched when the next pulse of a clock CLK has been output after the output of the start bit SB from the SB detector 210. The MCNT 211 is reset in synchronism with the next pulse of the clock CLK, and then the MCNT 211 resumes its counting operation in synchronism with the clock CLK. Accordingly, the RSI register 212 holds the count value of the MCNT 211, which is assumed between two start bits SB, i.e. an actually measured servo interval.

The EOS generator 228 of the servo controller 21 outputs a servo interrupt signal EOS to the CPU 24 as long as the R/W channel 20 correctly detects a servo mark. Each pulse of the signal EOS is output a predetermined period of time after the time point at which a start bit SB is output from the SB detector 210 in accordance with the detection of a servo mark. In accordance with the servo interrupt signal EOS from the EOS generator 228, the CPU 24 executes the servo interrupt process (FW process) according to the flowchart of FIG. 6, in the following manner.

First, the CPU 24 determines whether the operation mode of the servo controller 21 (and the R/W channel 20) is the startup mode or the normal mode (step S1). If it is the normal mode, the CPU 24 determines whether or not the conditions required to switch the operation mode to the startup mode are satisfied (step S2). In this embodiment, if a state, in which the output timing of each pulse of a servo gate is absent, occurs, for example, upon the first seek operation, upon head selection, or when servo mark detection errors have continuously occurred, the conditions required to switch the operation mode to the startup mode are supposed to be satisfied.

When the conditions are satisfied, the CPU 24 sets an effective (indicated by logic "1" in this embodiment) startup mode flag SUMF in the MS register 222 of the servo controller 21. As a result, the servo controller 21 is set in the startup mode (step S3). Further, unless the count value of the SBCNT 216 of the SBC detector 214 reaches "2", the CPU 24 determines that the output timing of each pulse of a servo gate SG does not correspond to a corresponding actual servo area 110 on each disk 11*i*, i.e. a corresponding physical servo position. In this case, the CPU 24 also sets the R/W channel in the startup mode (initial mode) (step S4). As a result, the R/W channel 20 executes the operation of searching servo information to detect a servo mark. The step S4 may be executed before the step S3.

After the steps S3 and S4, the CPU 24 turns on the servo gate SG when a second predetermined time period has elapsed after the rise of the leading edge of each pulse of a servo interrupt signal EOS (step S5). To turn on the servo gate SG, it is sufficient if the SGS register 223 is accessed to control the SG generator 227. After the turn-on of the servo gate GS, the R/W channel 20 detects servo information in the startup mode. The R/W channel 20 sequentially supplies, by serial transfer, the servo controller 21 with servo mark quality information, a gray code and burst data (PES information) detected by the servo information detection. A decoder (not shown) incorporated in the servo controller 21 decodes the gray code, transferred from the R/W channel 20, into a servo sector address and a cylinder address. The servo sector address, cylinder address and burst data are held in the SV register 221. On the basis of the cylinder address and burst data held in the SV register 221, the CPU 24 executes positioning control for positioning the head 12 in a target area on a target track. This positioning control will be described later in detail.

After the startup mode flag SUMF of logic "1 is set in the MS register 222, the servo controller 21 is switched to the startup mode, whereby a state signal indicative of the state of the SUMF is input to the clear terminal CLR of the SBCNT 216 via the OR gate 217. As a result, the SBCNT 216 is cleared, thereby resetting its count value to "0". Thereafter, the count value of the SBCNT 216 is incremented by 1 each time the SB detector 210 detects a start bit SB.

Unless the count value of the SBCNT 216 of the SBC detector 214 reaches "2", the servo controller 21 is kept in the startup mode. When the SB detector 210 has detected a start bit SB in the startup mode, the EOS generator 228 outputs a servo interrupt signal EOS to the CPU 24. The CPU 24, in turn, executes the servo interrupt process (FW process) according to the flowchart of FIG. 6, in the following manner.

First, in light of the fact that the operation mode of the servo controller 21 (and the R/W channel 20) is the startup mode (step S1), the CPU 24 turns off the servo gate SG when, for example, a first predetermined time period (the first predetermined time period<the second predetermined time period) has elapsed after the output of the servo interrupt signal EOS (step S6). To turn off the servo gate SG, it is sufficient if the SGR register 224 is accessed, to thereby control the SG generator 227. After that, the CPU 24 accesses the SGS register 223 when the second predetermined time period has elapsed after the output of the servo interrupt signal EOS, thereby causing the SG generator 227 to turn on the servo gate SG (step S5). On the basis of servo information detected by the R/W channel 20 while the servo gate SG is in the ON state, the CPU 24 executes servo control for positioning the head 12 in a target area on a target track.

When the count value of the SBCNT 216 has been switched from "1" to "2", i.e. when start bits SB corresponding to two pulses of the servo gate SG have been continuously detected, the MS register 222 is reset. As a result, the startup mode flag SUMF held in the register 222 is switched to "0". At this time, the operation mode of the servo controller 21 is automatically switched from the startup mode to the normal mode. The CPU 24 reads, by the FW process, the startup mode flag SUMF held in the MS register 222, and detects that the operation mode of the servo controller 21 has been switched to the normal mode. In this case, the CPU 24 switches the operation mode of the R/W channel 20 from the startup mode (initial mode) to the normal mode.

After the count value of the SBCNT 216 reaches "2" and the operation mode of the servo controller 21 is switched to the normal mode, the counting operation of the SBCNT 216 is disabled. As a result, the count value of the SBCNT 216 is kept at "2" even if the SB detector 210 detects a start bit SB. The configuration may be modified such that the CPU 24 accesses the SBCNTC register 225 to cause an effective signal 219 with logic "1" to be output from the OR gate 217 to the clear terminal of the SBCNT 216, thereby clearing the SBCNT 216.

In the startup mode, while the servo gate SG is in the ON state under the control of the CPU 24, it is possible that the R/W channel 20 will not detect a servo mark. In this case, the R/W channel 20 transfers, to the servo controller 21, servo mark quality information having its second bit set at "0", i.e. servo mark information indicating that no servo mark was detected. Upon receiving the servo mark quality information, having its second bit set at "0", from the R/W channel 20, the BS detector 210 of the servo controller 21 does not execute the output of a start bit SB based on the first bit of the quality information. A start bit SB51, indicated by the broken line in FIG. 5B, expresses this state. The broken line indicates that no start bit SB has been output and hence detected.

If the SB detector 210 has not detected any start bit SB, i.e. if the detection of a servo mark has failed, the MCNT 211 continues counting until the count value reaches a predetermined upper limit. The SBM detector 215 compares the count value of the MCNT 211 with a reference value. If the count value of the MCNT 211 is higher than the reference value, the SBM detector 215 determines that the absence of a start bit has occurred. The reference value corresponds to a time period which is enough to detect a servo mark. If the count value of the MCNT 211 is higher than the reference value, the SBM detector 215 outputs a signal 218 with logic "1" that indicates the detection of the absence of a start bit. The signal 218 is input to the clear terminal CLR of the SBCNT 216 via the OR gate 217. As a result, the SBCNT 216 is cleared and its count value is reset to "0". In other words, when the absence of a start bit SB has been detected, the SBCNT 216 is reset to "0". By virtue of this configuration, the SBCNT 216 of the SBC detector 214 can count the number of start bits SB continuously detected.

In the embodiment, the EOS generator 228 generates and outputs a pseudo servo interrupt signal EOS if the count value of the MCNT 211 exceeds a predetermined value. Therefore, the CPU 24 can execute the FW process, as shown in the timing charts of FIGS. 5A to 5G, also when the absence of a start bit has occurred.

The arithmetic unit 226 calculates a correction value necessary to provide servo gate timing that reflects changes in the servo interval, and calculates the servo gate timing using the correction value. The arithmetic unit 226 executes these calculations irrespective of the operation mode of the servo controller 21. However, only in the normal mode, the calculation result is actually used to generate a servo gate SG. In the startup mode, the arithmetic unit 226 determines whether or not its calculation result is valid. If the calculation result of the arithmetic unit 226 is invalid, the arithmetic unit 226 outputs a signal 220 with logic "1". The signal 220 is input to the clear terminal CLR of the SBCNT 216 via the OR gate 217. As a result, the SBCNT 216 is cleared, and its count value is reset to "0". The correction value calculated by the arithmetic unit 226 may be determined to be valid only when the count value of the SBCNT 216 reaches "2". If the correction value is invalid, it is sufficient merely if the count value of the SBCNT 216 is decremented by 1, i.e. merely if it is set to "1".

As described above, in the embodiment, the startup mode (first mode) is set when it is possible, upon, for example, head selection, that the timing of a servo gate may vary. In the startup mode, the R/W channel 20 monitors read information, and starts the operation of detecting a servo mark from the read information when a servo gate has been turned on. After detecting the servo mark, the R/W channel 20 executes the operation of detecting the next position information (a cylinder address and burst data) from read information at the timing determined by the servo mark detection timing. In other words, the channel 20 executes the operation of detecting a servo mark and position information without using the synchronous servo method. If the SBC detector 214 detects that a plurality of servo marks have been continuously detected in the startup mode, i.e. if the non-continuity of servo positions is overcome, the operation mode is switched to the normal mode (second mode). In the normal mode, the R/W channel 20 executes the operation of detecting a servo mark and position information, using the synchronous servo method. As a result, in the embodiment, even if the physical servo position (in particular, the circumferential position on a disk) varies upon, for example, head selection, such a variation can be compensated for. Accordingly, in the embodiment, the degradation of the performance of the HDD can be minimized upon, for example, head selection.

Figures 7A, 7B, 7C:
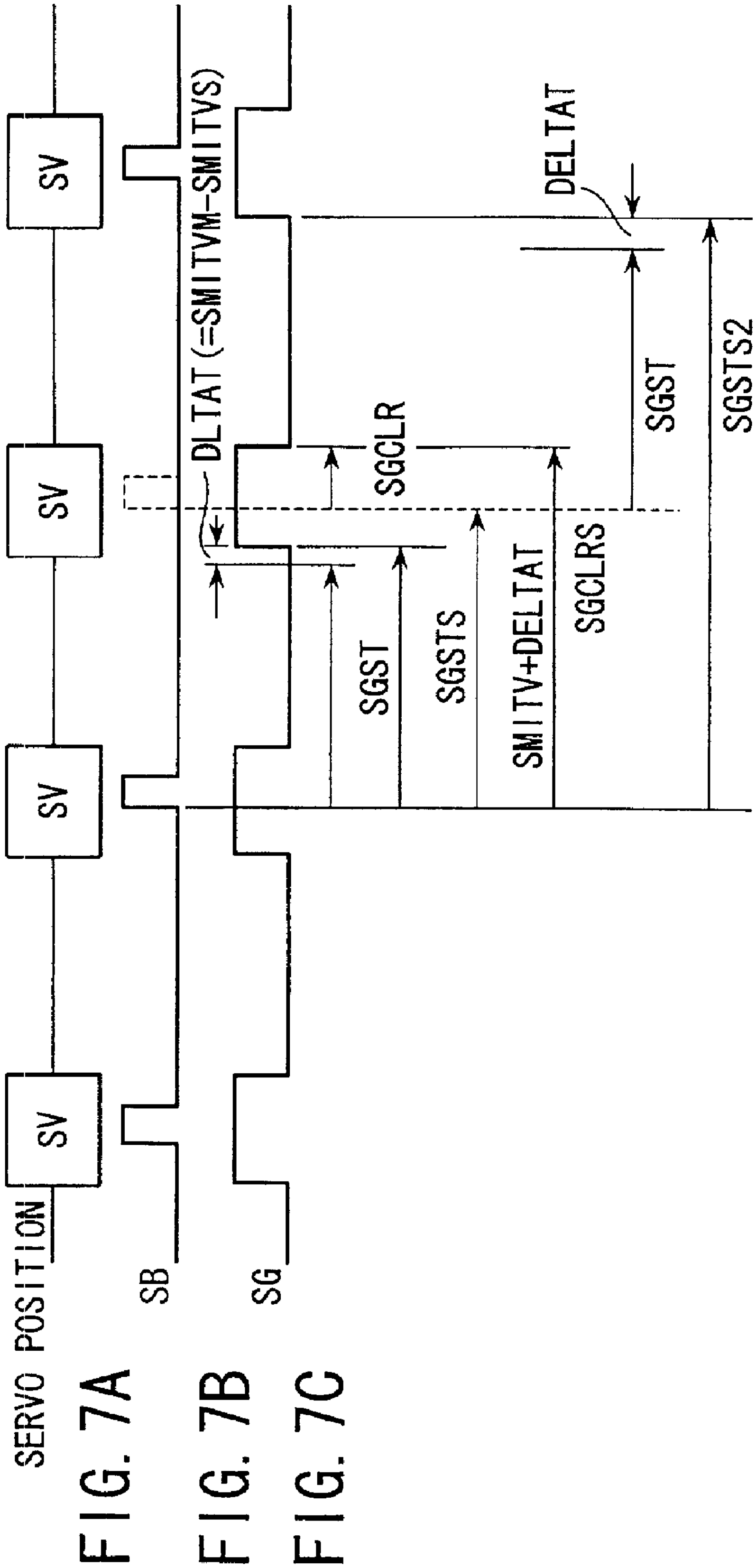
FIGS. 7A to 7C are views useful in explaining an arithmetic operation executed in the embodiment by an arithmetic unit 226 to provide the timing of a servo gate.

Referring then to FIGS. 7A to 7C, a description will be given of a calculation of servo gate timing by the arithmetic unit 226, using, as an example, a seek operation for moving the head 12 to a target track on a corresponding disk 11*i*. During the seek operation, the arithmetic unit 226 executes three types of calculations for calculating timings SGSTS, SGCLRS and SGSTS2, which serve as calculations for correcting variations in the servo interval. The timing SGSTS indicates a timing, at which the next pulse of a servo gate is output (the servo gate is turned on), with reference to the position of a start bit SB. The timing SGCLRS indicates a timing with reference to the preceding start bit SB, the timing being used, when the absence of a start bit has occurred, for turning off the servo gate. The timing SGSTS2 indicates a timing used, when the absence of a start bit has occurred, for again turning on the servo gate that was turned off at the timing SGCLRS. SGST represents a standard timing with reference to a start bit SB, at which a servo gate is turned on, while SGCLR represents a standard timing with reference to a start bit SB, at which a servo gate is turned off. Further, SMITV represents an interval between two continuous servo areas 110, i.e. one servo interval. SMITVS represents the theoretical count value of the MCNT211 assumed during one servo interval, while SMITVM represents the actual count value of the MCNT211 assumed during one servo interval, i.e. the value of the RSI register 212. SGST, SGCLR, SMITV and SMITVS represent fixed values.

In this case, the arithmetic unit 226 calculates DELTAT, that is, a deviation from the theoretical count value of the MCNT 211 during one servo interval, using the following equation:

$$DELTAT=SMITVM-SMITVS \quad (1)$$

Using DELTAT, the arithmetic unit 226 calculates the timings SGSTS, SGCLRS and SGSTS2, using the following equations:

$$SGSTS=SGST+DELTAT \quad (2)$$

$$\begin{aligned} SGCLRS &= SGCLR + SMITVM - SMITVS + SMITV \\ &= SGCLR + DELTAT + SMITV \end{aligned} \quad (3)$$

$$\begin{aligned} SGSTS2 &= SGST + (SMITVM - SMITVS)*2 + SMITV \\ &= SGST + DELTAT*2 + SMITV \end{aligned} \quad (4)$$

When a start bit SB has been detected for the first time upon the activation of the HDD, a calculation is executed, setting SMITVM=0.

A description will now be given of an outline of servo control executed upon head selection in the HDD of FIG. 1. Generally, in the servo control, a position, at which servo information that may be obtained in the next occasion is recorded, is estimated from a control variable based on continuous servo information. In the conventional method in which servo information is written to a disk by a head incorporated in an HDA, a mechanical position error in the heads, corresponds to a physical servo position error. Accordingly, the continuity of servo positions between the heads, i.e. the continuity of position information is secured. Owing to this continuity, in the seek control and positioning control (track following control) executed by the CPU 24 in the servo interrupt process, the reliability of a position calculated from actually acquired position information (a cylinder address and burst data) can be determined on the basis of the calculated position and an estimated position. If the calculated position is determined to be unreliable, the estimated position is used in place of the calculated position. This enables highly accurate servo control.

On the other hand, in the case of writing servo information to a disk using the pre-servo method, it is very possible that position information obtained by a head of a disk may not be continuous with that obtained by a head of another disk. In this case, the reliability of an estimated value itself is important. In light of this, attention must be paid to the use of an estimated head position, upon head selection.

In this embodiment, when using an estimated value, one of the following three methods A to C, or a combination of at least two of the three methods, is employed:

(A) A method for limiting, upon head selection, the use of an estimated head position;

(B) A method for limiting, upon head selection, the use of an estimated head position, but enlarging the range in which the estimated position is used; and (C) A method for detecting a difference in position information between heads upon manufacturing an HDD, storing, in the FROM 25, estimated-head-position parameters determined from the difference and used only immediately after head selection, and determining conditions (a predetermined range) for determining the reliability of the aforementioned calculated position.

The addition of an algorithm for using an estimated head position upon head selection enables the use of an estimated value with the reliability of an acquired head position kept high, even if the continuity of position information is lacking between heads.

Referring to the flowchart of FIG. 8, servo control using the method A will be described. As described above, upon receiving a servo interrupt signal EOS from the EOS generator 228 of the servo controller 21, the CPU 24 executes the servo interrupt process according to the flowchart of FIG. 6. During the interrupt process, the CPU 24 executes servo control, as follows, for positioning a head 12 in a target area on a target track on the basis of servo information detected by the R/W channel 20.

Specifically, at first, the CPU 24 reads position information (a cylinder address and burst data) necessary for servo control, from the SV register 221 of the servo controller 21 (step S11). Then, the CPU 24 calculates the present position of the head 12 from the read position information (step S12). Subsequently, the CPU 24 determines whether or not the number of servo interrupt processes executed after the start of head selection exceeds a predetermined value (step S13). If the number of servo interrupt processes is not more than the predetermined value, the CPU 24 determines that the reliability of an estimated value is low due to the influence of the non-continuity of position information between before and after the head selection. In this case, the CPU 24 determines that the use of the estimated value should be avoided irrespective of the position calculation result at the step S12. Therefore, the CPU 24 calculates a controlled variable (a VCM controlled variable) used to determine a driving current necessary for driving the VCM 15, on the basis of the position information calculated at the step S12 (step S14). The calculated, controlled variable is set in the VCM driver 17. As a result, a corresponding driving current is supplied from the VCM driver 17 to the VCM 15 to drive the VCM 15.

On the other hand, if the number of servo interrupt processes exceeds the predetermined value, the CPU 24 determines that the influence of the non-continuity of position information between before and after the head selection is low, and hence the reliability of the estimated value is high. In this case, the CPU 24 determines whether or not the position calculated at the step S12 (the presently calculated position) falls within a predetermined range (a normal predetermined range) determined with reference to the present head position (an estimated value) calculated (estimated) from the preceding position information (step S15). The normal predetermined range (a first predetermined range) is $\pm\alpha$ with respect to the estimated value calculated from the preceding position information.

If the presently calculated position falls within the normal predetermined range, the CPU 24 determines that the reliability of the presently calculated position is high, thereby calculating a VCM controlled variable on the basis of the calculated position (step S14). On the other hand, if the presently calculated position falls outside the normal predetermined range, i.e. if the presently calculated position falls outside the normal predetermined range even though the influence of the non-continuity of position information between before and after the head selection is low, the CPU 24 determines that the reliability of the presently calculated position is low. In this case, the CPU 24 uses the estimated value in place of the presently calculated position (step S16), thereby calculating the VCM controlled variable on the basis of the estimated value (step S14).

As described above, in the embodiment, until the number of servo interrupt processes executed after the start of head selection exceeds a predetermined value, the use of an estimated value in the interrupt process is avoided. This prevents the use of a value erroneously estimated due to the influence of the non-continuity of position information between before and after head selection.

Referring then to the flowchart of FIG. 9, servo control employing the aforementioned method B will be described. As at the step S11 of FIG. 8, the CPU 24 reads head position information from the SV register 221 of the servo controller 21 (step S21). Subsequently, the CPU 24 calculates the present position of a head 12 from the read position information (step S22). Thereafter, the CPU 24 determines whether or not the number of servo interrupt processes executed after the start of head selection exceeds a predetermined value (step S23). If the number of servo interrupt processes executed after the start of the head selection exceeds a predetermined value, the CPU 24 executes steps S24–S26 similar to the steps S14–S16 in FIG. 8.

If, on the other hand, the number of servo interrupt processes is not more than the predetermined value, the CPU 24 determines whether or not the position calculated at the step S22 (the presently calculated position) falls within a predetermined range (a second predetermined range) only used immediately after head selection (step S27). The predetermined range (the second predetermined range) only used immediately after head selection is $\pm\beta$ ($\beta>\alpha$) with respect to the present head position calculated from the preceding position information. As is evident, the predetermined range only used immediately after head selection is wider than the normal predetermined range.

If the presently calculated position falls within the predetermined range only used immediately after head selection, the CPU 24 determines that the reliability of the presently calculated position is high, thereby calculating a VCM controlled variable on the basis of the calculated position (step S24). On the other hand, if the presently calculated position falls outside the predetermined range only used immediately after head selection, i.e. if the presently calculated position falls outside the range even though this range (the predetermined range only used immediately after head selection) is set wider than the normal predetermined range in light of the number of servo interrupt processes being not more than the predetermined value, the CPU 24 determines that the reliability of the presently calculated position is low. In this case, the CPU 24 uses an estimated value in place of the presently calculated position (step S26), thereby calculating the VCM controlled variable on the basis of the estimated value (step S24).

Thus, in the embodiment, until the number of servo interrupt processes executed after the start of head selection exceeds a predetermined value (about 1–3 in this embodiment), the use of an estimated value in the interrupt process is allowed only under particular conditions. In other words, a range only used immediately after head selection, which is wider than a normal range, is employed, and the use of an estimated value is prohibited as long as the presently calculated position falls within the wider range. This widens the range in which the use of an estimated value is allowed, and also prevents the use of a value erroneously estimated due to the influence of the non-continuity of position information between before and after head selection.

Figure 10:
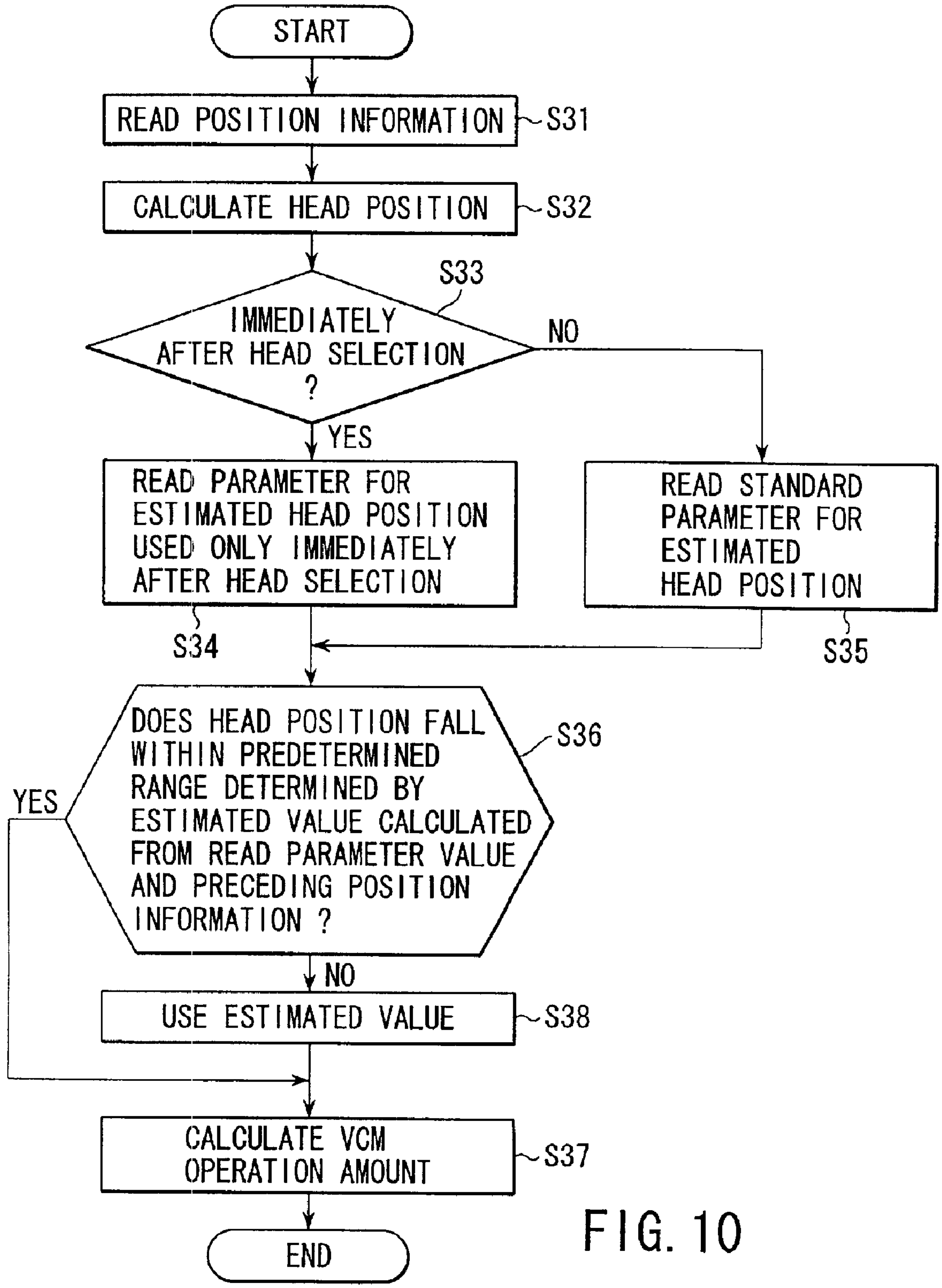
FIG. 10 is a flowchart useful in explaining another modification of the servo control executed by the CPU 24 in the servo interruption process in the embodiment.

Referring to the flowchart of FIG. 10, servo control employing the aforementioned method C will be described. The flowchart of FIG. 10 is commonly used in any type of servo control executed in the servo interrupt process not only upon head selection. First, in the embodiment employing the method C, in the manufacturing stage of the HDD of FIG. 1, a difference in position information between heads, i.e. a difference in head positions, is detected. The FROM 25 stores a parameter (a first parameter) for an estimated head position, which is determined by the detected difference and used only immediately after head selection. The FROM 25 also stores a parameter (a second parameter) for an estimated normal head position, which is used for a single head (a disk surface) in which the continuity of position information is secured. These parameters may be recorded on each disk **11*i*, and be loaded, for use, to the RAM 26** upon the initialization of the HDD.

Figure 8:
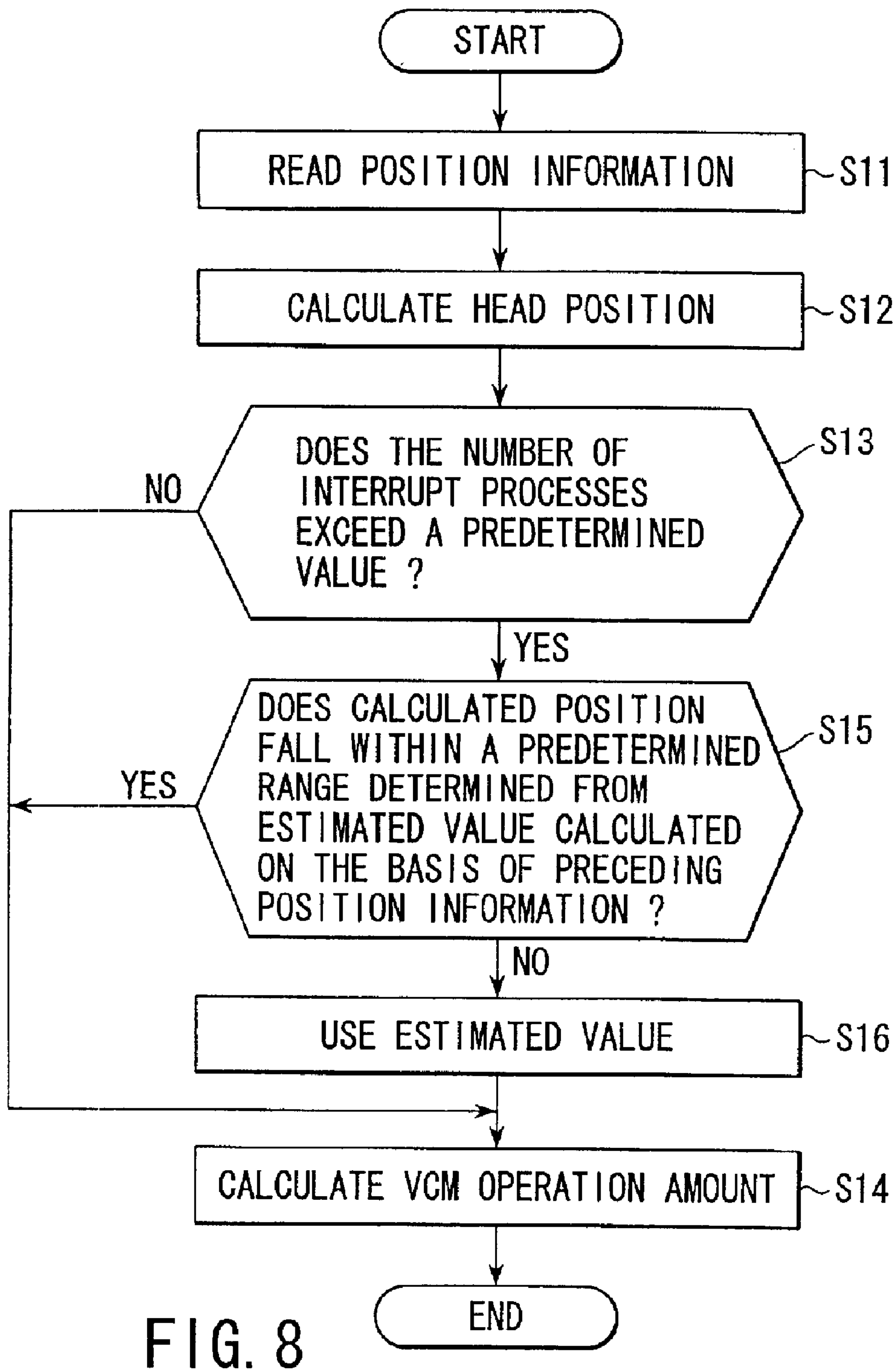
FIG. 8 is a flowchart useful in explaining servo control executed by the CPU 24 in the servo interruption process in the embodiment.
Figure 9:
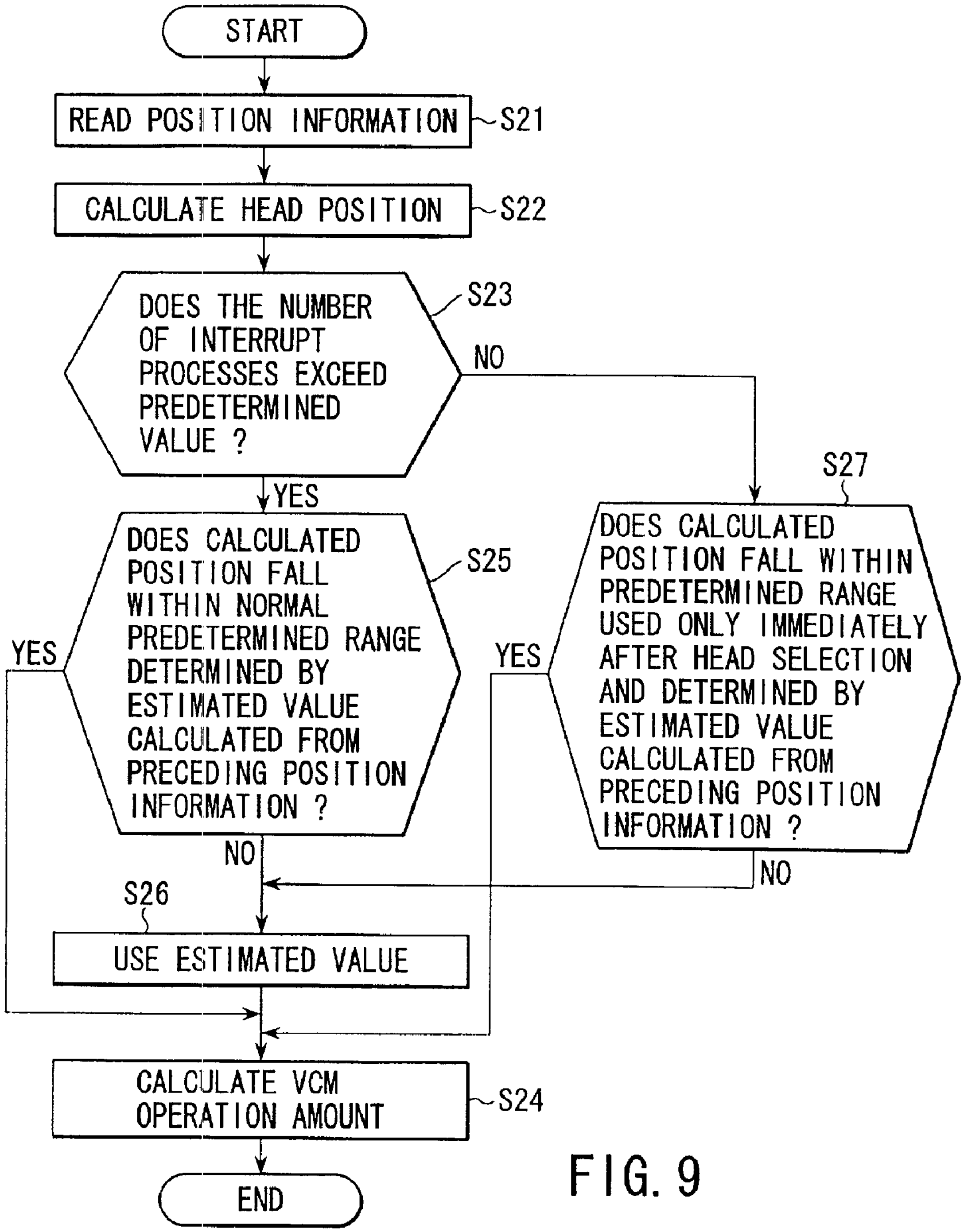
FIG. 9 is a flowchart useful in explaining a modification of the servo control executed by the CPU 24 in the servo interruption process in the embodiment.

As at the step S11 of FIG. 8, the CPU 24 reads head position information from the SV register 221 of the servo controller 21 (step S31). Subsequently, the CPU 24 calculates the present position of a head 12 from the read position information (step S32). Thereafter, the CPU 24 determines whether or not the servo interrupt process is that executed immediately after head selection (step S33). If the servo interrupt process is that executed immediately after the head selection, the CPU 24 reads, from the FROM 25, a parameter value for an estimated head position used only immediately after the head selection (step S34). If, on the other hand, the servo interrupt process is not that executed immediately after the head selection, the CPU 24 reads, from the FROM 25, a parameter value for an estimated normal head position (step S35). In place of the determination as to whether or not the servo interrupt process is that executed immediately after head selection, the determination as to whether or not the number of servo interrupt processes exceeds a predetermined value may be carried out. Naturally, the case where the number of servo interrupt processes is one corresponds to that executed immediately after head selection.

After executing the step S34 or S35, the CPU 24 determines whether or not the position calculated at the step S12 (the presently calculated position) falls within a predetermined range (step S36). This predetermined range is determined on the basis of the present head position (an estimated value) that is calculated from a parameter value read at the step S34 or S35 and the preceding position information.

If the presently calculated position falls within the predetermined range, the CPU 24 determines that the reliability of the presently calculated position is high, thereby calculating a VCM controlled variable on the basis of the calculated position (step S37). On the other hand, if the presently calculated position falls outside the predetermined range, the CPU 24 determines that the reliability of the presently calculated position is low. In this case, the CPU 24 uses the estimated value in place of the presently calculated position (step S38), thereby calculating the VCM controlled variable on the basis of the estimated value (step S37).

As described above, in the embodiment, the FROM 25 (a nonvolatile memory device) prestores a parameter for an estimated head position, which reflects a difference in the positions of heads and is used only immediately after head selection. Further, in the embodiment, immediately after head selection, it is determined, using a range determined from a parameter value and the preceding position information, whether or not a head position (presently calculated position) calculated on the basis of the presently acquired position information has a high reliability. Thus, a high-accuracy determination is executed.

In the above-described embodiment, a description has been given of a case where it is supposed that the servo positions (the positions of the servo areas 110) corresponding to one head may be physically displaced from those corresponding to another head, and hence a process, which characterizes the embodiment, is executed upon head selection in order to eliminate the influence of the displacement. However, it is little possible that the servo positions on one recording surface of a disk, which correspond to one head, will be physically displaced from those on the other recording surface of the disk, which correspond to another head. Therefore, the aforementioned particular process may be executed upon head selection between different disks. In this case, the expression "head selection" used in the embodiment means "head selection between different disks". Furthermore, in the embodiment, the present invention is applied to an HDD (Hard Disk Drive). However, the present invention is also applicable to a disk drive, other than the HDD, such as a magneto-optical disk drive.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive apparatus comprising:

a plurality of disks each including at least one recording surface on which servo information items each containing position information are recorded, each servo information item containing a servo mark used to identify said each servo information item, the servo information items being recorded at regular intervals on a single circumferential portion of each recording surface of the disks;

a head provided for each recording surface of the disks and used at least to read information from a corresponding disk;

means for selecting one of the heads;

a servo gate generator configured to generate a series of servo gate pulses indicative of timings at which the servo information items are read by a head, selected by the selecting means from the corresponding disk;

detection means for starting, in a first mode each time the servo gate generator generates a servo gate pulse, detection of the servo mark, contained in said each servo information item, from information read by the selected head from the corresponding disk, thereby detecting, from the read information, the position information contained in said each servo information item, at a timing determined by a timing at which the servo mark has been detected, the detection means detecting, in a second mode, the servo mark and the position informaton, contained in said each servo information item, from the information read by the selected head from the corresponding disk, at respective timings determined, by timings at which the servo gate generator generates respective servo gate pulses;

means for controlling, in the first mode, generation of the servo gate pulses by the servo gate generator, using a program; and a servo-mark-continuity detector configured to detect, in the first mode, that servo marks have been detected continuously, thereby switching the first mode to the second mode.

2. A disk drive apparatus comprising:

a plurality of disks each including at least one recording surface on which servo information items each containing position information are recorded, each servo information item containing a servo mark used to identify said each servo information item, the servo information items being recorded at regular intervals on a single circumferential portion of each recording surface of the disks;

a head provided for each recording surface of the disks and used at least to read information from a corresponding disk;

means for selecting one of the heads;

a servo gate generator configured to generate a series of servo gate pulses indicative of timings at which the servo information items are read by a head selected by the selecting means, from the corresnonding disk;

detection means for starting, in a first mode each time the servo gate generator generates a servo gate pulse, detection of the servo mark, contained in said each servo information item, from information read by the selected head from the corresponding disk, thereby detecting, from the read information, the position information contained in said each servo information item, at a timing determined by a timing at which the servo mark has been detected, the detection means detecting, in a second mode, the servo mark and the position information, contained in said each servo information item, from the information read by the selected head from the corresnonding disk, at respective timings determined by timings at which the servo gate generator generates respective servo gate pulses; and means for controlling, in the first mode, generation of the servo gate pulses by the servo gate generator, using a program, wherein the controlling means sets the first mode, when conditions are satisfied under which output timings of the servo gate pulses do not correspond to timings at which the servo information items are read by the selected head from the corresponding disk.

3. A disk drive apparatus comprising:

a plurality of disks each including at least one recording surface on which servo information items each containing position information are recorded, each servo information item containing a servo mark used to identify said each servo information item, the servo information items being recorded at regular intervals on a single circumferential portion of each recording surface of the disks;

a head provided for each recording surface of the disks and used at least to read information from a corresponding disk;

means for selecting one of the heads;

a servo gate generator configured to generate a series of servo gate pulses indicative of timings at which the servo information items are read by a head, selected by the selecting means, from the corresponding disk;

detection means for starting, in a first mode each time the servo gate generator generates a servo gate pulse, detection of the servo mark, contained in said each servo information item, from information read by the selected head from the corresponding disk, thereby detecting, from the read information, the position information contained in said each servo information item, at a timing determined by a timing at which the servo mark has been detected, the detection means detecting, in a second mode, the servo mark and the position information, contained in said each servo information item, from the information read by the selected head from the corresponding disk, at respective timings determined by timings at which the servo gate generator generates respective servo gate pulses;

a servo-mark-continuity detector configured to detect, in the first mode, that servo marks have been detected continuously;

a mode select register configured to indicate one of the first and second modes, the mode select register being switched from a first-mode-indicating state to a second-mode-indicating state when the servo-mark-continuity detector has detected that servo marks have been detected continuously;

means for controlling, in the first mode, generation of the servo gate pulses by the servo gate generator, using a program, wherein the controlling means sets the mode select register in the first-mode-indicating state, when conditions are satisfied under which output timings of the servo gate pulses do not correspond to timings at which the servo information items are read by the selected head from the corresponding disk.

4. The disk drive apparatus according to claim 3, further comprising means for outputting, when the detection means has detected the servo mark, a predetennined pulse indicative of the detection of the servo mark, and wherein the servo-mark-continuity detector monitors the predetermined pulse output from the outputting means, to thereby detect that servo marks have been detected continuously.

5. The disk drive apparatus according to claim 4, further comprising a first counter configured to start a time measurement, in which the number of clock pulses contained in a predetermined clock signal is counted, each time the outputting means outputs the predetermined pulse, and wherein the servo-mark-continuity detector includes;

a servo-mark-absence detector configured to monitor a count value of the first counter to thereby detect a servo-mark absent state indicating that no servo mark has been detected; and a second counter configured to count the number of predetermined pulses in the first mode, the second counter being reset when the servo-mark-absence detector has detected the servo-mark--absent state, the second counter indicating that servo marks have been detected continuously, if a count value of the second counter reaches a predetermined value.

6. The disk drive apparatus according to claim 5, wherein the mode select register is switched from the first mode to the second mode if the count value of the second counter reaches the predetermined value.

7. The disk drive apparatus according to claim 5, further comprising;

a real-servo-interval register configured to hold, as a servo interval with which each adjacent pair of the servo information items are detected, the count value of the first counter assumed in synchronism with a corresponding clock pulse of the clock signal each time the outputting means outputs the predetermined pulse; and an arithmetic unit configured to calculate a correction value necessary to correct the timing of each servo gate pulse so as to reflect a change in the servo interval indicated by the read-servo-interval register, and wherein the servo gate generator generates, in the second mode, the series of servo gate pulses on die basis of the correction value calculated by the arithmetic unit.

8. A disk drive apparatus comprising:

a plurality of disks each including at least one recording surface on which servo information items each containing position information are recorded each servo information item containing a servo mark used to identify said each servo information item, the servo information items being recorded at regular intervals in a single circumferential portion of each recording surface of the disks;

a head provided for each recording surface of the disks and used at least to read information from a corresponding disk;

means for selecting one of the heads;

means for detecting the servo mark and position information, contained in said each servo information item, from information read from the corresponding disk by a head selected by the selecting means;

an interrupt generator configured to generate an interrupt signal at a timing at which the detecting means detects the servo mark; and control means for starting an interrupt process in response to the interrupt signal, thereby executing servo control using one of a calculated position of the head selected by the selecting means, and a present position of the selected head, the calculated position being calculated from the position information detected by the detection means, the present position being estimated from position information detected by the detection means in a preceding occasion, the control means changing conditions between a first case where the number of interrupt processes executed after starting head selection does not exceed a predetermined value, and a second case other than the first case, the conditions being used to determine whether the calculated head position or the estimated head position should be used, wherein in the first case, or if, in the second case, the calculated head position, calculated from the position information detected by the detection means, falls within a predetermined range determined on the basis of the present position of the head, the control means executes the servo control using the calculated head position, the present position being estimated from the position information detected by the detection means in the preceding occasion, the control means executing the servo control using the estimated head position in the second case if the calculated head position falls outside the predetermined range.

9. A disk drive apparatus comprising:

a plurality of disks each including at least one recording surface on which servo information items each containing position information are recorded each servo information item containing a servo mark used to identify said each servo information item, the servo information items being recorded at regular intervals in a single circumferential portion of each recording surface of the disks;

a head provided for each recording surface of the disks and used at least to read information from a corresponding disk;

means for selecting one of the heads;

means for detecting the servo mark and position information, contained in said each servo information item, front information read from the corresponding disk by a head selected by the selecting means;

an interrupt generator configured to generate an interrupt signal at a timing at which the detecting means detects the servo mark; and control means for starting an interrupt process in response to the interrupt signal, thereby executing servo control using one of a calculated position of the head selected by the selecting means, and a present position of the selected head, the calculated position being calculated from the position information detected by the detection means, the present position being estimated from position information detected by the detection means in a preceding occasion, the control means changing conditions between a first case where the number of interrupt processes executed after starting head selection does not exceed a predetermined value, and a second case other than the first case, the conditions being used to determine whether the calculated head position or the estimated head position should be used, wherein the control means executes the servo control using the calculated head position, in the first case if the calculated head position calculated from the position information detected by the detection means falls within a first predetermined range determined on the basis of the present position of the head, which is estimated from the position information detected by the detection means in the preceding occasion, or in the second case if the calculated head position falls within a second predetermined range wider than the first predetermined range determined from the estimated head position, the control means executing the servo control using the estimated head position, in the first case if the calculated head position falls outside the first predetermined range, or in the second case if the calculated head position falls outside the second predetermined range.

10. A disk drive apparatus comprising:

a plurality of disks each including at least one recording surface on which servo information items each containing position information are recorded each servo information item containing a servo mark used to identify said each servo information item, the servo information items being recorded at regular intervals in a single circumferential portion of each recording surface of the disks;

a head provided for each recording surface of the disks and used at least to read information from a corresponding disk;

means for selecting one of the heads;

means for detecting the servo mark and position information, contained in said each servo information item, front information read from the corresponding disk by a head selected by the selecting means;

an interrupt generator configured to generate an interrupt signal at a timing at which the detecting means detects the servo mark;

a storage unit which prestores a first parameter determined from a difference in the position information, the difference being used to estimate a head position assumed immediately after head selection, the storage unit also prestoring a second parameter used to estimate a head position at a time other than immediately after the head section; and control means for starting an interrupt process in response to the interrupt signal, thereby executing servo control using one of a calculated position of the head selected by the selecting means, and a present position of the selected head, the calculated position being calculated from the position information detected by the detection means, the present position being estimated from position information detected by the detection means in a preceding occasion, the control means changing conditions between a first case where the number of interrupt processes executed after starting head selection does not exceed a predetermined value, and a second case other than the first case, the conditions being used to determine whether the calculated head position or the estimated head position should be used, wherein the control means reads the first parameter from the storage unit in each interrupt process in the first case, and reads the second parameter from the storage unit in each interrupt process in the second case, the control means executing the servo control using the calculated head position if the calculated head position falls within a predetermined range determined on the basis of the present position of the head, the present position being estimated from both the read parameter and the position information detected by the detection means in the preceding occasion, the control means executing the servo control using the estimated head position if the calculated head position falls outside the predetermined range.

11. A method of compensating for an error in servo-information-recorded position between heads, which occurs upon head selection for selecting one of the heads, the method being used in a disk drive equipped with a plurality of disks each including at least one recording surface with circumferential portions on each of which servo information items are recorded at regular intervals, each servo information item containing an inherent servo mark used to identify said each servo information item, the disk drive being also equipped with heads provided for the respective recording surfaces of the disks and used at least to read data from the respective disks, the method comprising:

starting in a first mode each time a servo gate pulse is generated, to detect the servo mark, contained in said each servo information item, by monitoring read information read by a selected head from a corresponding disk, thereby detecting from the read information the position information contained in said each servo information item, at a timing determined by a timing at which the servo mark has been detected;

detecting in a second mode, the servo mark and the position information, contained in said each servo information item, from the information read by the selected head from the corresponding disk, at respective timings determined by timings at which respective servo gate pulses are generated;

controlling in the first mode generation of the servo gate pulses using a program;

setting the first mode when conditions are satisfied under which output timings of the servo gate pulses do not correspond to timings at which the servo information items are read by the selected head from the corresponding disk;

detecting in the first mode, that servo marks have been detected continuously; and switching the first mode to the second mode if it is detected that servo marks have been detected continuously.

* * * * *